United States Patent [19]

Smith

[11] Patent Number: 5,600,916
[45] Date of Patent: Feb. 11, 1997

[54] FISHING LURE CONSTRUCTION

[76] Inventor: David N. Smith, 7637 Orchard La., Maple Grove, Minn. 55351

[21] Appl. No.: 308,675

[22] Filed: Sep. 19, 1994

[51] Int. Cl.⁶ ................................................ A01K 85/16
[52] U.S. Cl. ...................... 43/42.47; 43/42.35; 43/42.49; 43/42.31
[58] Field of Search ........................... 43/42.31, 42.32, 43/42.53, 42.47, 42.27, 42.45, 24, 42, 35, 42.35, 42.49

[56]                    References Cited

U.S. PATENT DOCUMENTS

| 1,710,102 | 4/1929 | Moore . | |
| 1,881,823 | 10/1932 | McKenzie | 43/42.47 |
| 2,207,425 | 7/1940 | Arbogast . | |
| 2,579,991 | 12/1951 | Wood | 43/42.47 |
| 2,781,604 | 2/1957 | Brown . | |
| 2,944,363 | 7/1960 | Poe . | |
| 3,142,927 | 8/1964 | Stram . | |
| 3,303,597 | 2/1967 | Leach . | |
| 3,319,371 | 5/1967 | Sills . | |
| 3,445,953 | 5/1969 | Dailey | 43/42.47 |
| 3,541,718 | 11/1970 | Norman | 43/42.47 |
| 3,665,634 | 5/1972 | Baud | 43/35 |
| 3,753,310 | 8/1973 | Werner | 43/42.39 |
| 3,757,451 | 9/1973 | Cottle | 43/42.1 |
| 4,052,809 | 10/1977 | Reinhardt . | |
| 4,129,957 | 12/1978 | Thirlby | 43/42.49 |
| 4,141,171 | 2/1979 | Muddiman | 43/42.47 |
| 4,144,665 | 3/1979 | Dake . | |
| 4,471,556 | 9/1984 | Dworski | 43/42.23 |
| 4,671,006 | 6/1987 | Schuyler, Jr. | 43/42.48 |
| 4,696,120 | 9/1987 | Schroeder | 43/43.1 |
| 4,700,504 | 10/1987 | Mattison | 43/42.33 |
| 4,807,388 | 2/1989 | Cribb | 43/42.47 |
| 4,819,365 | 4/1989 | Landuydt | 43/42.47 |
| 4,823,497 | 4/1989 | Pierce | 43/42.31 |
| 5,020,265 | 6/1991 | Nuckols | 43/42 |
| 5,020,266 | 6/1991 | Williamson | 43/42.39 |

Primary Examiner—Kurt Rowan
Assistant Examiner—Jay A. Stelacone
Attorney, Agent, or Firm—Dorsey & Whitney LLP

[57]                    ABSTRACT

An artificial plastic lure has a plastic lure body, one or more plastic hook attachment eyelets integrally formed with the lure body and a line receiving eyelet connected with the lure body near its forward end.

10 Claims, 2 Drawing Sheets

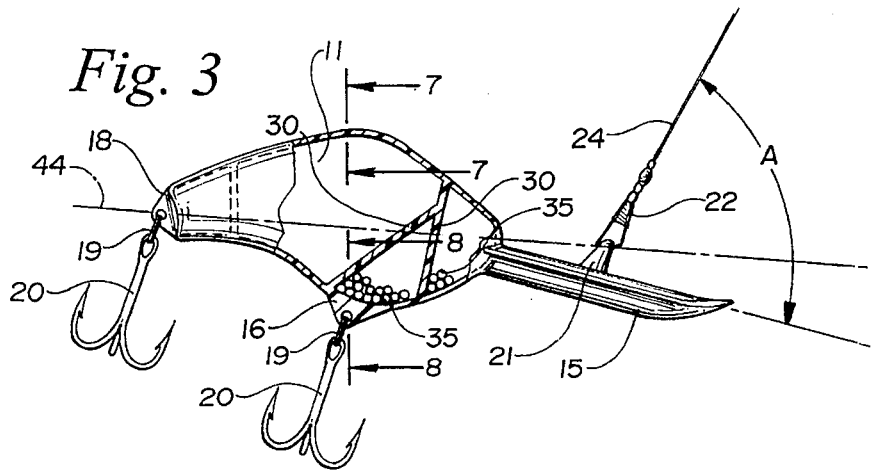
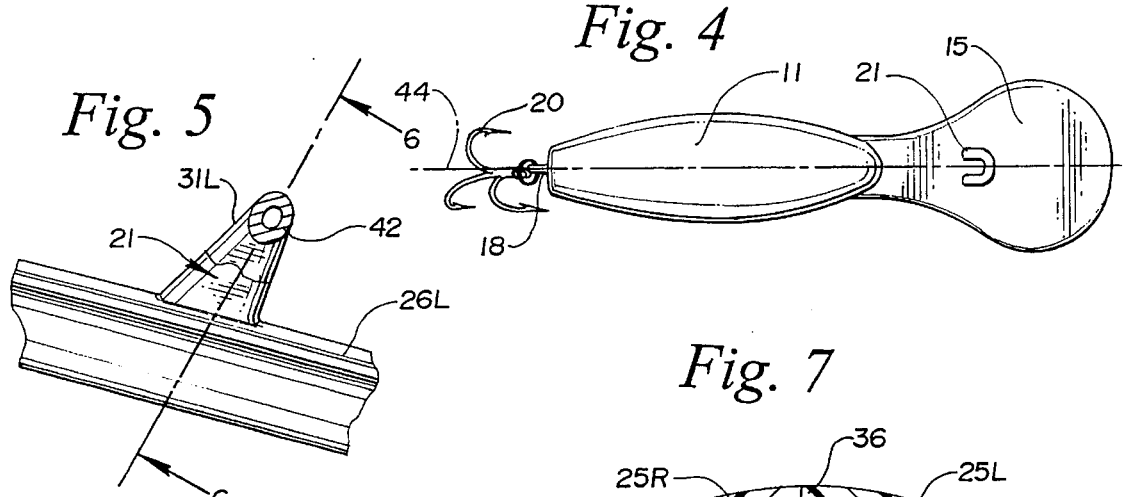
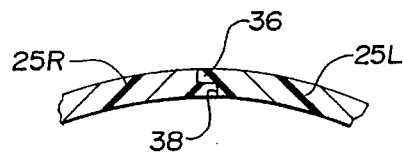
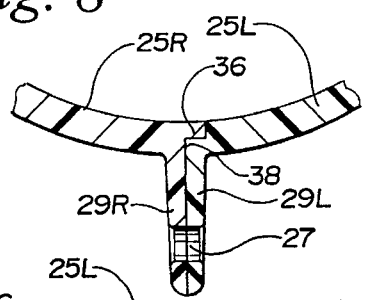

FISHING LURE CONSTRUCTION

BACKGROUND OF THE INVENTION

1. Field of the Invention

The present invention relates to an artificial plastic fishing lure and a method for making the same. More particularly, the present invention relates to a plastic fishing lure having one or more molded plastic hook receiving eyelets and/or a molded plastic line receiving eyelet having an orientation which provides for improved self-centering of the lure during use. The invention also relates to a method of making the above lure.

2. Description of the Prior Art

Conventional plastic fishing lures are made by forming two halves of the lure via an injection molding process. Upon completion of the molded halves, a wire or metal hook hanger is inserted and connected between the halves for the purpose suspending metal hook attachment rings to the lure. The two halves of the lure are then joined by sonic welding or the like. In a similar fashion, many of these prior art fishing lures are also provided with a metal or wire line attachment eyelet by suspending such eyelet between the molded halves or by otherwise connecting the eyelet to the forward end of the lure for attaching a fishing line. Due in large part to the use of metal or wire hook and line receiving hangers and their attachment to the plastic molded halves, the process of making prior art plastic fishing lures is labor intensive and thus quite expensive. Accordingly, a need exists for a fishing lure and method which eliminates the need for the relatively expensive metal or wire hook hangers and the labor intensive process of assembling the same.

SUMMARY OF THE INVENTION

In accordance with the present invention, and contrary to the prior art, the present invention relates to an improved artificial plastic fishing lure and method of making the same. One feature of the present invention is the provision of a lure having one or more molded plastic hook receiving eyelets. A further feature of the fishing lure of the present invention involves the provision of a molded plastic line receiving eyelet and a particular orientation of such eyelet relative to the lure to provide for improved self centering of the lure as it is pulled through the water. Such eyelet orientation causes the lure of the present invention to always run true, thus obviating the need to tune the bait.

More specifically, the fishing lure in accordance with the preferred embodiment of the present invention includes a plastic body having a forward end and a rearward end and one or more plastic hook attachment eyelets which are integrally formed with the lure body. The lure is also provided with a line receiving eyelet which is also preferably a plastic molded eyelet integrally formed with the lure body. The preferred embodiment of the lure includes a forward bill in which the line receiving eyelet is connected to the bill and oriented so that it lies in plane perpendicular to a plane passing through the symmetrical center of the lure to provide improved self centering.

Accordingly, it is an object of the present invention to provide a plastic, artificial fishing lure having one or more plastic hook attachment eyelets integrally formed with the lure body. Another object of the present invention is to provide a plastic, artificial fishing lure having an integrally formed plastic line receiving eyelet.

Another object of the present invention is to provide a plastic, artificial fishing lure having a line receiving eyelet orientation which provides for improved self centering of the lure and eliminates the need to tune the lure.

A still further object of the present invention is to provide an improved method for making a plastic, artificial fishing lure of the type described above.

A still further object of the present invention is to provide a method for making a plastic, artificial fishing lure having one or more molded hook receiving eyelets.

These and other objects of the present invention will become apparent with reference to the drawings, the description of the preferred embodiment and the appended claims.

DESCRIPTION OF THE DRAWINGS

FIG. 3 is an elevational side view of a finished lure with an attached fishing line and with portions broken away.

FIG. 4 is an elevational plan view of the fishing lure of the present invention.

FIG. 5 is a fragmentary view of a portion of the bill and line receiving eyelet with portions broken away.

FIG. 6 is a view, partially in section, as viewed along the section line 6—6 of FIG. 5.

FIG. 7 is view, partially in section, as viewed along the section line 7—7 of FIG. 3.

FIG. 8 is a view, partially in section, as viewed along the section line 8—8 of FIG. 3.

FIG. 9 is a view similar to FIG. 7, but with a modified hook receiving eyelet structure.

DESCRIPTION OF THE PREFERRED EMBODIMENT

Figure 1:
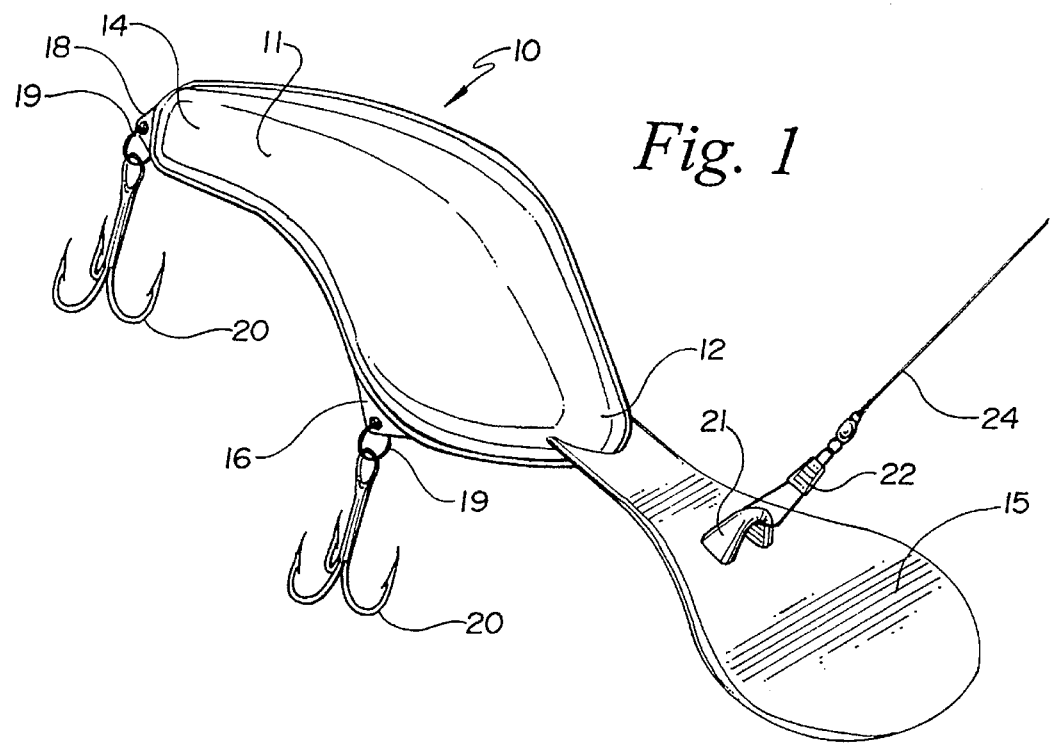
FIG. 1 is a perspective view of finished lure in accordance with the present invention with an attached fishing line and snap.

With initial reference to FIG. 1, the present invention relates to an artificial plastic fishing lure 10 having a plastic lure body 11 with a forward end 12, a rearward end 14 and one or more plastic hook attachment eyelets 16 and 18 integrally formed with the lure body 10. As used herein, the term "plastic" is used in its broadest sense to include, among other things, all synthetic material capable of being molded, cast or otherwise formed into a fishing lure. The lure of the present invention can be made from a variety of plastics, however, a polycarbonate is preferred. Polyesters, among others, can also be used. In the preferred embodiment, the hook attachment eyelet 16 is integrally formed with a bottom surface of the body 11 at about its midpoint while the second hook attachment eyelet 18 is integrally formed with the lure body 11 at its rearward end 14. The hook attachment eyelets, can, of course, be positioned in various locations on the lure body 11 and can comprise a single hook attachment eyelet or multiple hook attachment eyelets as shown in FIG. 1. Connected with each of the hook attachment eyelets 16 and 18 is a metal or wire hook connecting ring 19 and a fish hook 20 which, in the preferred embodiment, is a treble hook.

In the fishing lure of the preferred embodiment, a forwardly extending bill 15 is integrally formed with the forward end 12 of the body 11. The bill 15 is provided with a plastic line receiving eyelet 21 integrally formed with the top surface of the bill. As will be described in greater detail below, the line receiving eyelet 21 is oriented relative to the bill 15 and the body 11 such that it slopes forwardly relative to the top surface of the bill at an angle of about 60° to 80° and is oriented relative to the body 11 such that the eyelet 21 lies in a plane perpendicular to a plane extending through a symmetrical center of the body 11.

Figure 2:
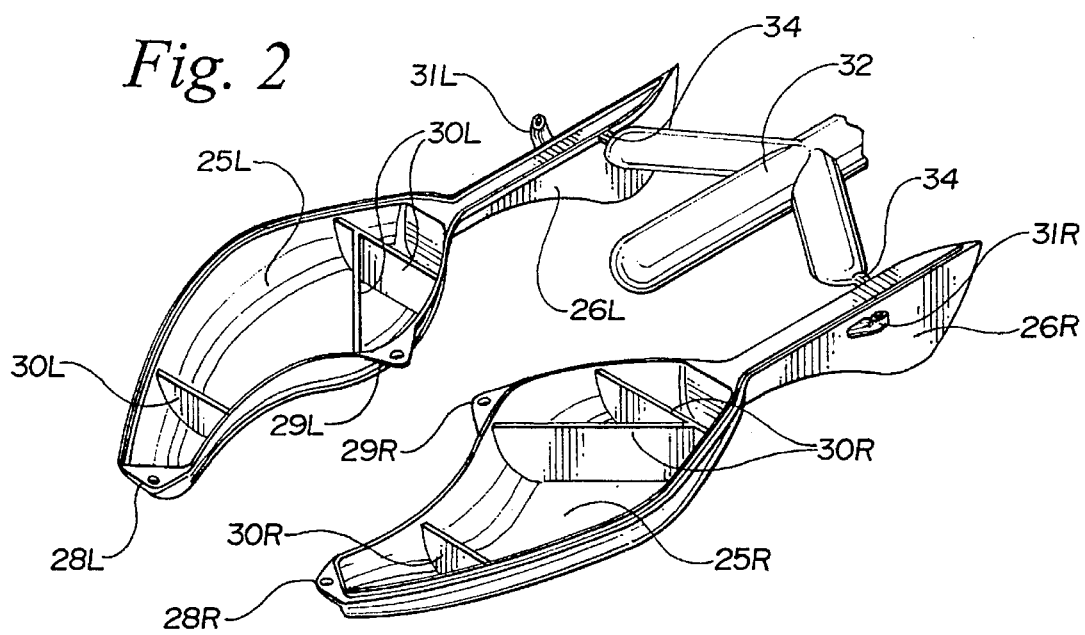
FIG. 2 is a perspective view of two halves of the plastic fishing lure in accordance with the present invention as mounted on a molding runner and tree.

Reference is next made to FIG. 2 showing the fishing lure components prior to assembly into the finished lure. The lure in accordance with the present invention is a completely plastic lure constructed of a thermal plastic material via an injection molding process. FIG. 2 illustrates the lure components following the injection molding process and prior to assembly. As shown, fishing lure 10 (FIG. 1) is comprised of a pair of injection molded lure halves identified by the reference characters 25R and 25L. The pair of lure halves needed to produce the lure 10 of FIG. 1 includes a right lure half 25R and a left lure half 25L. In the following description, the letter R following a reference character will designate that particular character on the right molded half, while the letter L will represent that particular element on the left molded half. In the preferred embodiment, each of the molded halves 25R and 25L are substantially symmetrical and, following the mold process, are connected by gates 34, 34 to a runner and tree assembly 32.

Each of the molded halves is provided with a pair of hook receiving eyelet portions 28R, 28L and 29R, 29L and a forwardly extending bill portion 26R and 26L. The bill portions 26R and 26L each include a line receiving eyelet portion 31R and 31L respectively. In the preferred embodiment, each of the hook receiving eyelets 28R, 28L, 29R, 29L and each of the line receiving eyelet portions 31R and 31L are integrally formed with the main body and bill portions of the components during the molding process. The internal cavity formed in each of the molded halves 25R, 25L is provided with a plurality of partitions 30R and 30L for the purpose of providing rigidity and strength to the lure body, when assembled, and for the purpose of receiving a plurality of BB's 35 (FIG. 3) if desired to function as a ballast for the lure and as a fish attractant rattle.

As shown best in FIGS. 7 and 8, the peripheral edges of the molded halves 25R and 25L are provided with a tongue and groove configuration 36, 38. This facilitates desired alignment of the peripheral edges and enables the edges to snap together during assembly. The peripheral edges of the bill portions 26R and 26L as shown in FIG. 6 are also preferably provided with a tongue and groove configuration 39, 40 for alignment purposes.

As shown best in FIG. 8, each of the hook receiving eyelet portions 29R and 29L is provided with a flat, planar inner surface for corresponding engagement with one another. The preferred embodiment shows each of the hook receiving eyelets 16 and 18 (FIG. 1) to be formed by a hook receiving eyelet portion 29R, 29L and 28R, 28L as shown in FIGS. 2; however, the benefits of the present invention can also be achieved if the hook receiving eyelets are formed in only one of the molded halves 25R or 25L as shown, for example, in FIG. 9. Further, as shown in FIGS. 8 and 9, each of the hook receiving eyelets is provided with an eyelet opening 27 to receive a metal or wire hook connection ring 19 (FIG. 1). In the preferred embodiment, the openings 27 are formed during the molding process; however, if desired, they can be drilled or formed after the molding has been completed.

As illustrated best in FIG. 6, each of the line receiving eyelet portions 31R and 31L includes a base end 33R and 33L integrally formed with the top surface of the bill portions 26R and 26L, respectively. The eyelet portions 31R and 31L extend upwardly from the top surface of the bill halves 26R and 26L and curve inwardly where they are joined together with a so-called peg and post configuration comprising a male peg or post 41 on one of the eyelet halves and a post receiving cavity 42 on the other. Preferably, the post 41 and cavity 42 are slightly tapered to insure a desired, tight-fitting relationship between the eyelet portions 31R and 31L.

As shown in FIGS. 3 and 4, the lure of the present invention has a longitudinal axis 44. As viewed from the side as shown in FIG. 3, the axis 44 extends generally horizontally through the rearward end 14 of the lure 10 and through the top end of the line receiving eyelet 21. As viewed from the top as shown in FIG. 4, the longitudinal axis 44 extends through the symmetrical center of the lure.

To provide the desired self-centering, and thus self tuning, function, the line receiving eyelet 21 is positioned on the top surface of the bill 15 so that the legs 33R, 33L (FIG. 6) of the line receiving eyelet are positioned on opposite sides of the longitudinal axis 44. In other words, the eyelet 21 lies in a plane (defined by the section line 6—6 of FIG. 5) which is perpendicular to a plane, passing through the symmetrical center of the lure. In the preferred embodiment, this would be a vertical plane extending through the longitudinal axis 44. Further, as shown best in FIG. 3, the line receiving eyelet 21 is formed so that it slopes forwardly relative to the top surface of the bill 15. Preferably the slope of the eyelet 21 forms an included angle "A" relative to the top surface of the bill 15 of about 60° to 80° and preferably about 70°. With this orientation of the eyelet 21, the fishing line 24 after the numeral 24 extends from the eyelet 21 at about this same angle during use of the lure. Such orientation of the line receiving eyelet 21 relative to the longitudinal axis 44 and the top surface of the bill provides for improved self-centering of the lure. This provides for consistency of desired lure action, with no need to tune the lure.

Having described the structure of the present invention, the method of making the fishing lure can be described best as follows. First, the right and left hand component halves are molded to form a configuration as illustrated in FIG. 2. Preferably, the molding process is an injection molding process in which the right and left halves 25R and 25L are formed in a single molding step on a runner and tree assembly 32. Although a variety of thermoplastic mold materials may be used, polycarbonate materials are preferred. Polyesters and other plastics may also be used.

Next, the molded halves 25R and 25L are removed from the runner and tree assembly 32 and are degated. This involves cutting off or removing remaining portions of the gates 34, 34 after separation from the assembly 32. BB's or other rattle and ballast means are, if desired, then loaded into the cavities formed by the partitions 30R and 30L. The particular quantity and distribution of the BB's will depend on the desired characteristics of each individual lure or type of lure.

Next, the two molded halves 25R and 25L are assembled together by aligning the tongue and groove edges around the periphery of the lure body and bill and by aligning the post and groove of the line receiving eyelet portions 31R and 31L. The two halves are then snapped together. This can be accomplished either manually or by a mechanized process. The lure halves 25R and 25L are then secured together either by gluing, welding or other connection processes known in the art. In accordance with the preferred embodiment, the molded halves 25R and 25L are secured together by dipping the lure into a plastic solvent. This results in the solvent flowing to or otherwise contacting the edge surfaces of the lure halves, thereby resulting in the edges softening or slightly dissolving. Then, upon evaporation of the solvent, the lure halves are bonded to one another. In the preferred process in which polycarbonate is used as the lure body plastic, a solvent such as methylene chloride is used. Methylene chloride is a very thin solvent which, upon dipping, immediately forces itself between the mating edge surfaces of the lure halves 25R and 25L, thereby causing the lure halves to be solvent bonded to one another upon evaporation of the solvent. Use of solvent bonding is also preferred because it removes imperfections from the lure surfaces resulting from the molding process. Other forms of bonding, however, can be used, including various epoxies or other adhesives as well as sonic and other welding techniques. Means can also be provided for mechanically securing the molded halves together, for example, with a snap groove configuration.

After bonding the molded halves together, the lure is painted. The hooks are then attached and the lure is packaged.

Although the description of the preferred embodiment and method has been quite specific, it is contemplated that various modifications could be made without deviating from the spirit of the present invention. Accordingly, it is intended that the scope of the present invention be dictated by the appended claims rather than by the description of the preferred embodiment.

I claim:

1. An artificial plastic fishing lure comprising:

a plastic lure body having a forward end and a rearward end and comprised of a pair of lure body halves secured together to form said lure body;

one or more hook attachment-eyelets connected with said lure body; and a plastic line receiving eyelet integrally molded with said lure body near its forward end and formed of the same material as said lure body, said line receiving eyelet including a base portion joined with body and a line attachment portion disposed outwardly from said base portion, said line attachment portion having a line receiving opening and a dimension measured in a direction perpendicular to said line receiving opening and said base portion having a dimension measured in a direction perpendicular to said line receiving opening, wherein said dimension of said base portion is greater than the dimension of said line attachment portion.

2. The fishing lure of claim 1 wherein said line receiving eyelet is comprised of a pair of line receiving eyelet portions integrally molded with said pair of molded halves, respectively, and secured together to form said line receiving eyelet.

3. The fishing lure of claim 1 wherein said lure body includes a bill at its forward end, said bill including top and bottom surfaces, a free end and a rearward end connected with said body, and wherein said line receiving eyelet is integrally molded with the top surface of said bill.

4. The fishing lure of claim 3 wherein said lure is substantially symmetrical relative to a first plane passing through said lure body, and wherein said line receiving eyelet lies in a second plane perpendicular to said first plane and slopes toward the free end of said bill such that it forms an included angle of 60° to 80° relative to the top surface of said bill.

5. The fishing lure of claim 4 wherein said included angle is about 70°.

6. An artificial fishing lure comprising:

a plastic lure body having a forward end and a rearward end, said lure body being substantially symmetrical relative to a first plane passing through said lure body and comprised of a pair of molded sections secured together to form said lure body;

one or more hook attachment eyelets connected with said lure body;

a bill integrally molded with the forward end of said body and formed of the same material as said lure body, said bill having top and bottom surfaces, a free end and a rearward end connected with said body; and a plastic line receiving eyelet integrally molded with and extending outwardly from the top surface of said bill and formed of the same material as said bill, said line receiving eyelet lying in a second plane perpendicular to said first plane and sloping toward the free end of said bill such that it forms an included angle of 60° to 80° relative to the top surface of said bill.

7. An artificial plastic fishing lure comprising:

a plastic lure body having a forward end and a rearward end and comprised of a pair of molded sections secured together to form said body;

one or more plastic hook attachment eyelets integrally molded with said lure body and formed of the same material as said lure body; and a line receiving eyelet connected with said lure body near its forward end, wherein at least one of said hook attachment eyelets comprises a tab extending outwardly from at least one of said molded sections, said tab having a base portion joined with said lure body and a hook attachment portion disposed outwardly from said base portion, said hook attachment portion having a hook receiving opening and a hook attachment portion dimension measured in a direction perpendicular to said line receiving opening and said base portion having a base portion dimension measured in a direction perpendicular to said line receiving opening, wherein said base portion dimension is greater than said hook attachment portion dimension.

8. The fishing lure of claim 7 wherein said lure body is substantially symmetrical relative to a first plane passing through said lure body and said base portion dimension and said hook attachment portion dimension are measured in the direction of said first plane.

9. The fishing line of claim 8 wherein said base portion has a second dimension measured at right angles to said first plane, wherein said hook attachment portion has a second dimension measured at right angles to said first plane and wherein said second dimension of said base portion is greater than said second dimension of said hook attachment portion.

10. The fishing lure of claim 7 further comprising an intermediate portion extending between said base and hook attachment portions and having an intermediate portion dimension and wherein said hook attachment portion dimension is no greater than said intermediate portion dimension.

* * * * *

UNITED STATES PATENT AND TRADEMARK OFFICE
CERTIFICATE OF CORRECTION

PATENT NO. : 5,600,916
DATED       : February 11, 1997
INVENTOR(S) : David N. Smith It is certified that error appears in the above-indentified patent and that said Letters Patent is hereby corrected as shown below:

In column 4, line 32, delete "24 after the numeral 24 extends" and insert --24, including the snap 22, extends--.

In column 5, line 42, delete "body" and insert --said body--.
On the title page, item [57],
In the abstract, add the following language: "The invention also involves a method of making the above fishing lure."

Signed and Sealed this

First Day of July, 1997

Attest:

BRUCE LEHMAN

*Attesting Officer*  *Commissioner of Patents and Trademarks*